(12) United States Patent
Enenkel et al.

(10) Patent No.: US 11,524,845 B2
(45) Date of Patent: Dec. 13, 2022

(54) FLAT SORTER OVER AT LEAST TWO LEVELS

(71) Applicant: SIEMENS AKTIENGESELLSCHAFT, Munich (DE)

(72) Inventors: Peter Enenkel, Constance (DE); Max Umbach, Constance (DE)

(73) Assignee: Körber Supply Chain Logistics GmbH, Constance (DE)

( * ) Notice: Subject to any disclaimer, the term of this patent is extended or adjusted under 35 U.S.C. 154(b) by 0 days.

(21) Appl. No.: 17/270,557

(22) PCT Filed: Aug. 6, 2019

(86) PCT No.: PCT/EP2019/071113
§ 371 (c)(1),
(2) Date: Feb. 23, 2021

(87) PCT Pub. No.: WO2020/038714
PCT Pub. Date: Feb. 27, 2020

(65) Prior Publication Data
US 2021/0198038 A1    Jul. 1, 2021

(30) Foreign Application Priority Data
Aug. 23, 2018  (EP) .................................... 18190511

(51) Int. Cl.
*B65G 37/02* (2006.01)
*B65G 47/34* (2006.01)
*B65G 1/04* (2006.01)
*B65G 43/10* (2006.01)

(52) U.S. Cl.
CPC ......... *B65G 1/0478* (2013.01); *B65G 1/0492* (2013.01); *B65G 37/02* (2013.01)

(58) Field of Classification Search
None
See application file for complete search history.

(56) References Cited

U.S. PATENT DOCUMENTS 5,350,050 A * 9/1994 Franke ..................... B65G 1/06
                                                           414/280
9,850,079 B2 * 12/2017 Cyrulik ................ B65G 1/0492

FOREIGN PATENT DOCUMENTS

| CN | 206868639 U | 1/2018 |
| CN | 207547050 U | 6/2018 |
| JP | 2016113291 A | 6/2016 |
| WO | 20160631397 A1 | 4/2016 |

* cited by examiner

*Primary Examiner* — Kavel Singh
(74) *Attorney, Agent, or Firm* — Price Heneveld LLP (57) ABSTRACT

A sorting system and a method for sorting piece goods provide for conveying the piece goods to be sorted on a delivery level to a delivery point and delivering them there into or onto a receiving device moving on a collection level receiving the piece goods. The collection level is disposed below the delivery level. The receiving device travels over an individually determined route on the collection level.

18 Claims, 7 Drawing Sheets

FLAT SORTER OVER AT LEAST TWO LEVELS

BACKGROUND OF THE INVENTION

Field of the Invention

The invention relates to the technical field of sorting piece goods over at least two levels.

To conserve available space, matrix or flat sorters are used nowadays for the distribution, sorting and consignment of inhomogeneous goods. These are based on tightly packed conveyor elements of different types (for example corner transfer conveyors, guide rollers, omni rollers, planar linear motors) in a conveyor level. On this level passive goods or load handling devices are conveyed from the inlet points to the destination end point on free or Cartesian paths. The significant costs for the conveyor elements installed close to the ground and the low level of use of these elements themselves are a disadvantage of these systems. A further disadvantage is the problem of crossings in a matrix, which reduces throughput. This is particularly the case when a very large number of goods or transport elements are to be conveyed or sorted at the same time.

Attempts are currently being made to solve the problem of high costs and low throughputs by:
  Enhanced dynamics of the system and of the movable elements;
  Intelligent or learning path control algorithms;
  Increased outlay in sensors for recognizing the position and movement of the conveyor goods located on the planar actuator surfaces.

SUMMARY OF THE INVENTION

The object underlying the invention is therefore to sort piece goods efficiently on a small surface area.

This object is achieved by the solutions described in the independent patent claims. Advantageous embodiments of the invention are specified in the further claims.

In accordance with one aspect a sorting system for sorting piece goods over at least two levels arranged above one another is presented. The sorting system comprises a delivery level, a collection level, a delivery level conveyor means for conveying piece goods on the delivery level and a collection level conveyor means for conveying piece goods on the collection level. The collection level is arranged below the delivery level. The delivery level comprises delivery points, via which piece goods can be delivered from the delivery level to the collection level. For example the delivery points are arranged in a matrix-like manner as holes in the delivery level, through which piece goods can be delivered from the delivery level to the collection level. The delivery level conveyor means comprises a delivery means that is embodied to deliver piece goods via one of the delivery points. The collection level conveyor means comprises a receiving means that is embodied to receive the piece goods delivered via the delivery level. The collection level conveyor means is embodied to have the receiving means on the collection level travel over an individually predetermined route.

In accordance with a further aspect a method for sorting piece goods is presented. An item of piece goods to be sorted is conveyed for a sorting step on a delivery level to a delivery point and delivered there into or onto a receiving means receiving piece goods and moving on a collection level arranged below the delivery level. In this case the receiving means travels over an individually predetermined route on the collection level.

In this way the receiving means can automatically travel over an individually predetermined route in order to receive or collect the piece goods delivered via the delivery point. In this case the individually predetermined route can be selected automatically by means of a control system for example so that a desired parameter is optimized. For example a fast sorting of the item of piece goods and/or a short path route for the item of piece goods and/or the avoidance of route crossings with other piece goods to be sorted and/or the avoidance of route crossings of the totality of piece goods to be sorted and/or an overall throughput of the sorting method can be optimized.

The route that can be determined individually can moreover be determined individually for example for the route of the receiving means to the delivery point and/or for the further route of the receiving means loaded with the item of piece goods onwards from the delivery point and/or for the sorting of the piece goods and/or for the receiving of the piece goods.

In accordance with a further exemplary embodiment the individually determined route is determined in that the delivery point via which the item of piece goods is delivered is selected or determined individually, for example in order to coordinate the routes of piece goods conveyed simultaneously on the delivery level and/or the collection level, to avoid crossing situations for example.

In accordance with an exemplary embodiment the receiving means travels over a route able to be determined individually on the collection level for the sorting step or for the sorting.

In accordance with an exemplary embodiment the delivery level conveyor means is designed to have the item of piece goods move on the delivery level for sorting the item of piece goods and/or for delivering the item of piece goods over an individually determined route. This further enhances the flexibility of the sorting system and of the sorting method and the options for avoiding the crossing of routes of piece goods to be sorted.

In accordance with a further exemplary embodiment the item of piece goods is conveyed to the delivery point by means of a receiving means moving on the delivery level and is delivered there from the delivery level receiving means into or onto the collection means moving on the collection level. In this case the same type of conveyor means can be used on the delivery level and on the collection level, whereby synergistic effects are produced in respect of investment costs and maintenance. However, as an alternative thereto different receiving means can also be used on the delivery level and the collection level. This is of advantage for example if the receiving means on the collection level are end points, since the piece goods are preferably collected sorted in these, while on delivery levels arranged above this level the receiving means are not yet or not completely sorted but are used for further sorting, and therefore must not serve as collection means. In accordance with one exemplary embodiment the receiving means only receive individual piece goods in accordance with the method, or the sorting system is designed to deliver an individual item of piece goods into the receiving means respectively, which is then also transported further individually by the receiving means.

In accordance with a further exemplary embodiment the receiving means moving on the delivery level travels over an individually determined route for sorting the piece goods. In other words the item of piece goods travels in this way on the delivery level over the individually determined route to the delivery point and/or onwards from the delivery point in the delivery level receiving means.

In accordance with a further exemplary embodiment the sorting system comprises a further delivery level and a further conveying means for conveying piece goods on the further delivery level. The further delivery level is arranged above the delivery level and comprises further delivery points. The further conveyor means is embodied to deliver the item of piece goods via one of the further delivery points into the delivery level receiving means. For example the further delivery points are embodied as holes in the delivery level for example, through which piece goods can be delivered from the further delivery level to the delivery level. The delivery level conveyor means comprises a delivery level receiving means. The delivery level receiving means is embodied for example directly to receive and collect the piece goods delivered from the further delivery level. In this way the flexibility of the sorting system can be further enhanced, in that sorting takes place over at least three levels, and additional crossing situations can be avoided.

In accordance with a further exemplary embodiment the piece goods travel over the individually determined route to the delivery point and/or away from the delivery point in the delivery level receiving means.

In accordance with an exemplary embodiment the piece goods, before they are conveyed on the delivery level, are conveyed for a further sorting step on the further delivery level to a further delivery point able to be individually selected for the piece goods and are delivered there into or onto the receiving means moving on the delivery level.

In accordance with further exemplary embodiments the receiving means moving on the collection level and/or the receiving means moving on the delivery level and/or the receiving means moving on the further level comprises a container wagon.

In accordance with further exemplary embodiments the container wagon or the container wagons comprise the delivery means, for example a trapdoor, a flap, a scoop or a roller floor and preferably is or are closed on five sides, or some other type of suitable delivery shaft.

In accordance with further exemplary embodiments the receiving means moving on the collection level is able to be driven via actuators arranged in the collection level. The receiving means moving on the delivery level and/or the receiving means moving on the further level can also be able to be driven via actuators arranged in the delivery level and/or in the further delivery level.

Actuators can be linear motors, rollers or belts for example. The receiving means can therefore be embodied passively, i.e. without its own drive. This has the advantage of lower costs for the receiving means.

In accordance with further exemplary embodiments the receiving means moving on the collection level and/or the receiving means moving on the delivery level and/or the receiving means moving on the further level can have a drive for moving them around. In other words these receiving means can be actively driven. The advantage of this is that stationary actuators do not absolutely have to be built into the sorting levels, and thereby initial investment costs can be lower and advantages are produced for the scalability of the sorting system.

In accordance with a further exemplary embodiment the sorting system comprises a control system, which is adapted to control the delivery level conveyor means and the collection level conveyor means so that piece goods delivered by the delivery means are collected by the receiving means.

In accordance with further exemplary embodiments the control system is adapted individually to determine the individually determined route of the receiving means on the collection level and/or the individually determined route of the piece goods on the delivery level and/or the individually determined route of the piece goods through the sorting system and/or a delivery point via which the piece goods will be delivered. This makes it possible individually to determine routes of piece goods through the sorting system, in order to optimize the sorting speed and/or in order to avoid goods being transported through the sorting system crossing. The sorting system or the method for sorting piece goods respectively is automated and driverless.

In accordance with further exemplary embodiments the control system is adapted, for a number of items of piece goods that are being sorted at the same time by the sorting system, to determine routes to be traveled over and/or delivery points in a coordinated manner, in order to avoid crossing events and/or to keep the routes over which the goods travel short for example.

In accordance with further exemplary embodiments the receiving means moving on the collection level and/or the receiving means moving on the delivery level and/or the receiving means moving on the further delivery level is a container wagon, which comprises the delivery mechanism embodied as the delivery means, for example a trapdoor, a flap, a scoop or a roller floor.

In accordance with further exemplary embodiments the sorting system comprises at least two levels arranged above one another, via which piece goods are sorted, wherein receiving means that, for sorting the piece goods, travel over individually determined routes are moving on the at least two levels. These levels can comprise delivery points arranged as a type of grid.

In accordance with a further exemplary embodiment the receiving means moving on the collection level is an end point.

In accordance with further exemplary embodiments the piece goods are sorted via the delivery level and the collection level, as well as via optional further levels arranged vertically below or above in relation to said levels and via receiving means moving thereon, wherein receiving means moving on the lowest of these levels are embodied as end points. The end points can optionally likewise be conveyed via individually determined routes to a destination point. An end point is preferably embodied to receive a number of piece goods with the same destination for example. Optionally receiving means of one or more delivery levels arranged above the collection level embodied as end point level are then sorting elements, by which further sorting takes place. These receiving means preferably receive a maximum of one item of piece goods, but in alternate forms of embodiment can also receive a number of items of piece goods.

In accordance with a further exemplary embodiment the collection level conveyor means and/or the delivery level conveyor means and/or the further conveyor means is embodied to convey the piece goods in or on the receiving means.

In accordance with a further exemplary embodiment the delivery points are embodied as holes in the delivery level and/or the delivery points of the further delivery level are embodied as holes in the further delivery level, through which piece goods are able to be delivered.

The invention will be explained in greater detail below for example with reference to the drawing.

DETAILED DESCRIPTION OF THE INVENTION

Figure 1A:
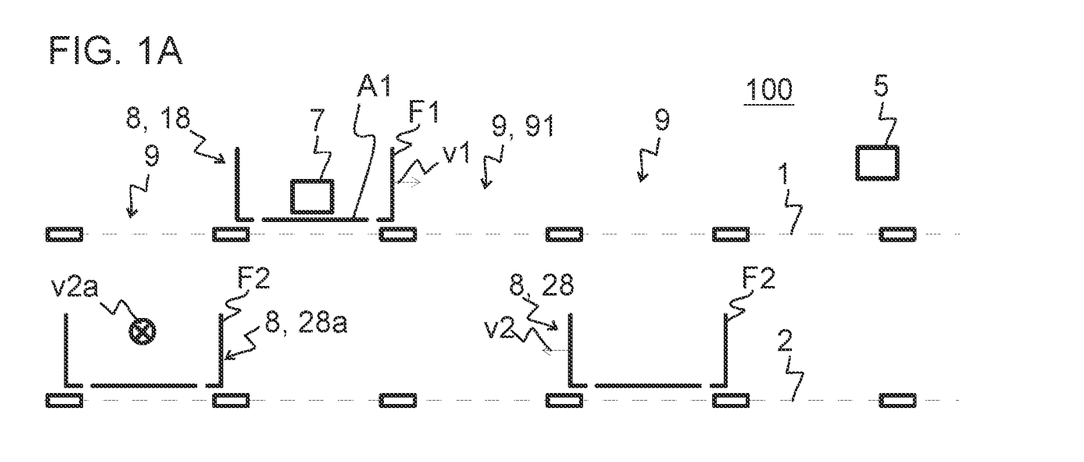
FIGS. 1A-C show a schematic side view of a sorting system as well as a method for sorting piece goods in accordance with an exemplary embodiment of the invention.
Figure 1B:
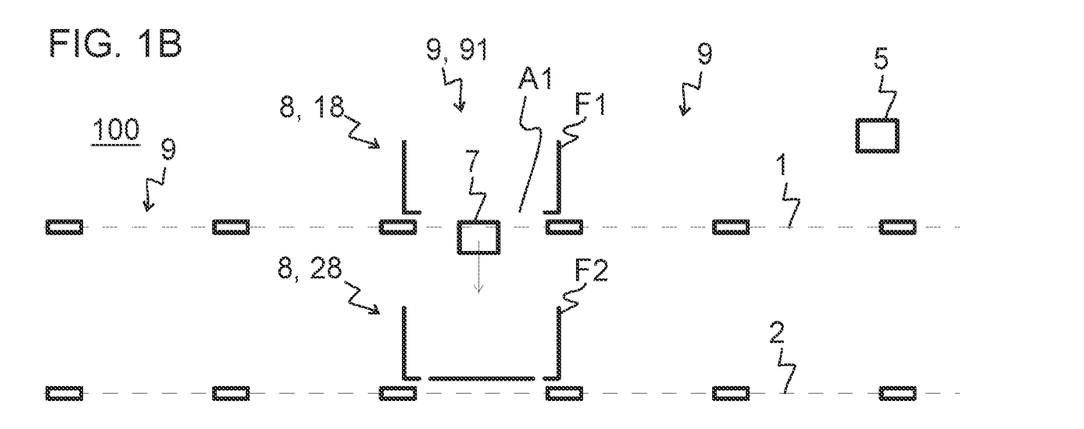
Figure 1C:
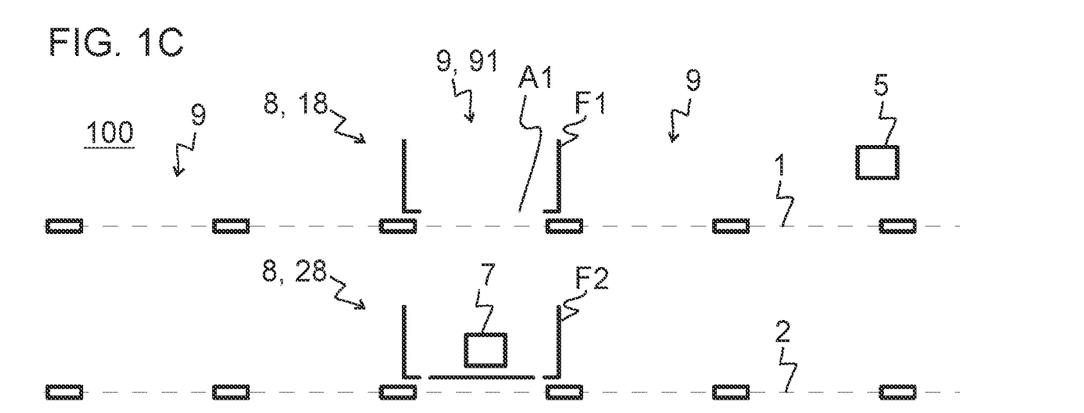

FIGS. 1A, 1B and 1C show a schematic side view of a sorting system 100 as well as a method for sorting piece goods in accordance with an exemplary embodiment of the invention.

Figure 4:
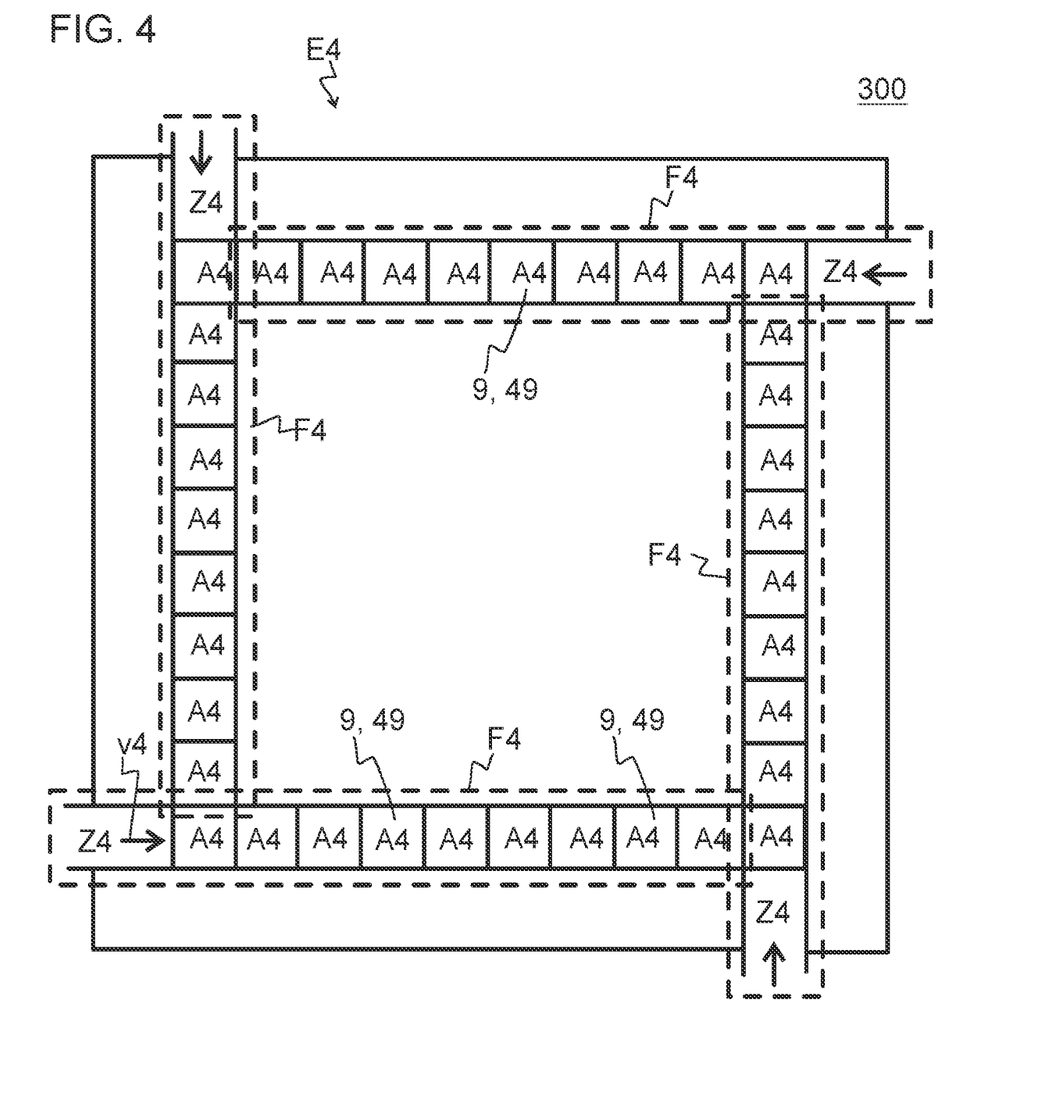
FIG. 4 shows a schematic of a topmost level of the sorting system from FIG. 3 in a view from above.
Figure 5:
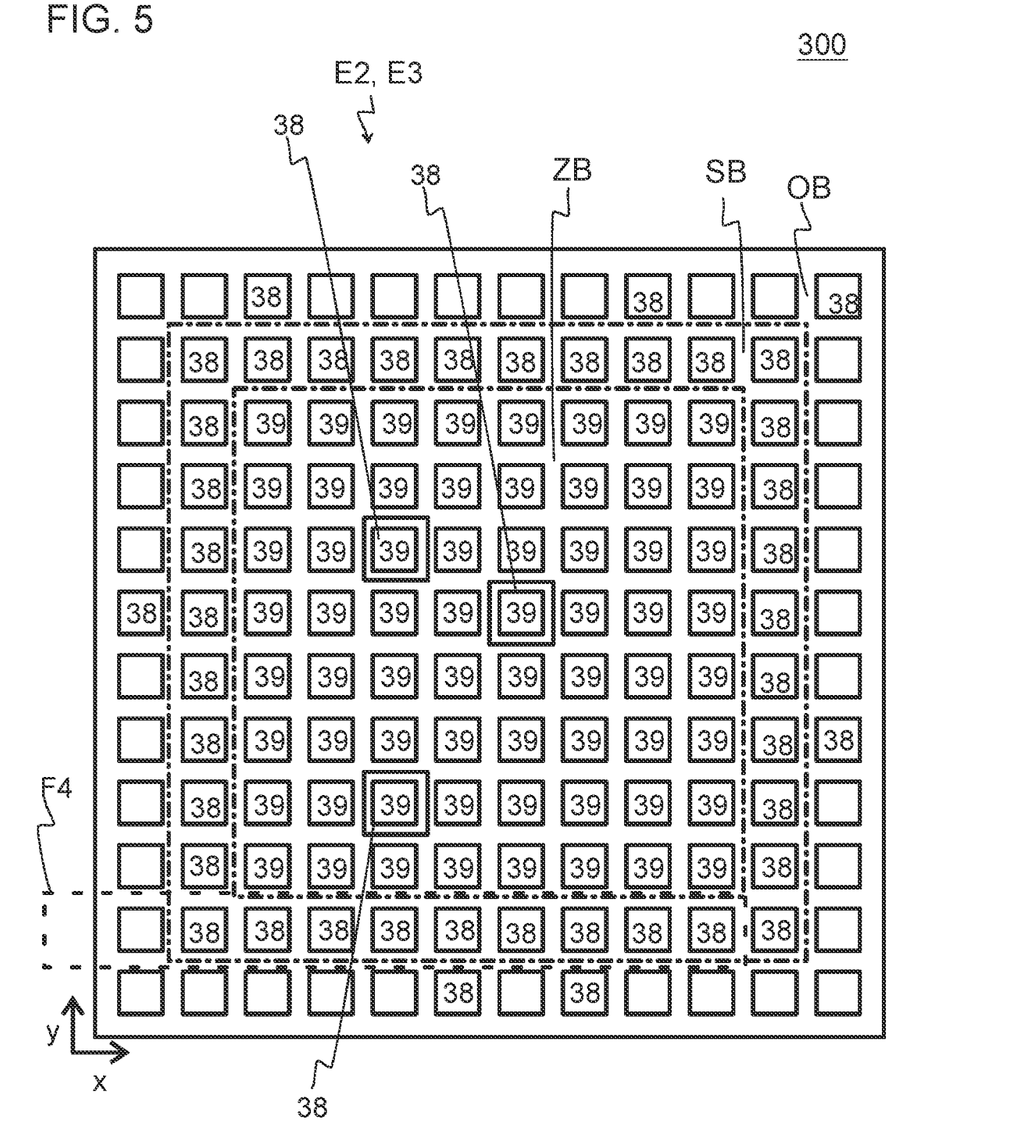
FIG. 5 shows a schematic of a middle level of the sorting system from FIG. 3 in a view from above.
Figure 6:
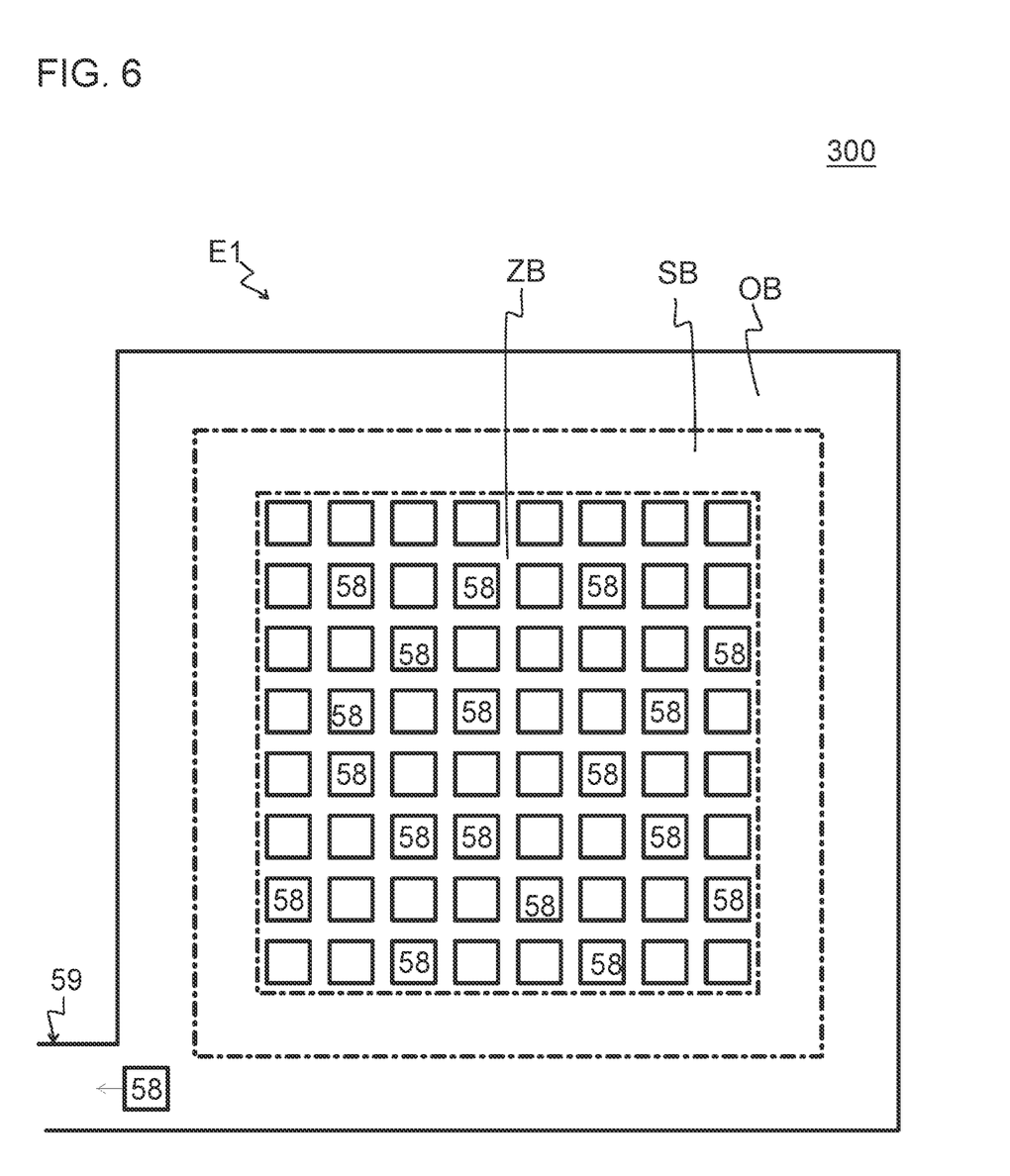
FIG. 6 shows a schematic of a lowest level of the sorting system from FIG. 3 in a view from above.

The sorting system 100 comprises a delivery level 1, a collection level 2, a delivery level conveyor means F1 for conveying piece goods on the delivery level 1 and a collection level conveyor means F2 for conveying piece goods on the collection level 2, as well as a control system 5 by which the conveyor means F1, F2 are able to be controlled. The delivery level 1 and the collection level 2 are arranged horizontally. The delivery level 1 is arranged at right angles above the collection level 2. The delivery level 1 comprises delivery points 9 arranged in a matrix-like manner, which are embodied as cutouts in the delivery level 1, and through which piece goods can be delivered to the collection level 2. FIG. 5 shows an overhead view of a possible embodiment of the delivery level 1 and of the collection level 2. FIG. 4 shows a possible variant of a delivery level with hinge-down conveyor elements. FIG. 6 shows a variant of a collection level 2.

Referring once again to FIGS. 1A-C, the conveyor means F1, F2 each comprise at least one receiving means 8 embodied as a container. The receiving means 8 of the receiving level 2 are also labeled with the reference characters 28, 28a, receiving means of the delivery level 1 are labeled with the reference character 18. In the exemplary embodiment shown in FIG. 1A-C two receiving means 28, 28a are shown for the conveyor means F2, while only one receiving means 18 is shown for the conveyor means F1. Preferably however both conveyor means F1, F2 each comprise a large number of receiving means 8 that, in collaboration with one another, sort a plurality of piece goods at the same time or undertake sorting steps for the plurality of piece goods at the same time. The receiving means 8, 18, 28, 28a are able to be conveyed by the conveyor means F1, F2 in the levels 1, 2. The movement of the receiving means 8 is symbolized in FIG. 1A by its speed vectors v1, v2, v2a. In this exemplary embodiment a conveyor means F1, F2 is embodied, at a given point in time, to convey a receiving means 8, 18, 28, 28a in one of two directions lying orthogonally in relation to one another in the levels 1, 2. In other exemplary embodiments a conveyor means F1, F2 is embodied to convey a receiving means 8, 18, 28, 28a in any given direction in the levels 1, 2.

In accordance with one variant the conveyor means F1 and/or the conveyor means F2 each comprise one or more mobile container wagons each with its own drive and a receiver means 18, 28, 28a embodied as a container. The drives can be electric drive machines for example.

In accordance with another variant the conveyor means F2 comprises actuators built into or onto the collection level 2 and passive receiving means. The passive receiving means do not comprise any drive of their own. For example the fixed actuators built into the collection level 2 can be driven roller tracks or belts, which drive receiving means embodied as containers in the collection level 2. The conveyor means F1 in the delivery level 1 can likewise comprise such fixed built-in actuators, which convey the passively embodied receiving means 18.

Linear motors can also be used as the conveyor means F1 and/or F2, which drive correspondingly embodied container wagons.

Likewise, in further exemplary embodiments, mixed forms with different conveyor means are possible on the levels 1, 2, as will be further illustrated with reference to the exemplary embodiments shown in FIGS. 3-8, where on four levels E1-E4, between directly vertically adjacent levels, sometimes different types of conveyor means and sometimes the same type of conveyor means are used.

In an exemplary embodiment that differs somewhat from that shown in FIGS. 1A-C, the delivery level conveyor means is embodied as a conveyor route or as a conveyor route system, which conveys the piece goods not in a receiving means, but lying directly on the conveyor route, for example on a conveyor belt and delivers an item of piece goods to the collection level 2 at the desired delivery point 91. This is particularly useful when the piece goods are singulated before they are sorted, as will be further explained within the context of further exemplary embodiments in conjunction with FIG. 4.

FIGS. 1A-C also illustrate a method for sorting piece goods at different points in time of the method in accordance with an exemplary embodiment of the invention.

FIG. 1A shows how the delivery level conveyor means F1 conveys the item of piece goods 7 on the delivery level 1 to a delivery point 91 of the delivery points 9 able to be individually selected for the piece goods 7, which is symbolized by the speed vector v1 of the receiving means 18, while the collection level conveyor means F2 conveys an empty receiving means 28 on the collection level 2 to below the delivery point 91, which is symbolized by the speed vector v2.

In both levels 1, 2 further receiving means are underway in order to sort other piece goods, which are symbolized by the receiving means 28a, which is moving with the speed v2a in another direction. The receiving means 28, 28a can move in the collection level 2 in two directions arranged orthogonally in relation to one another. A number of receiving means 8 are also preferably moving in the delivery level 1, which can move in the delivery level 1 in the two directions lying orthogonally in relation to one another.

FIGS. 1B and 1C show how, at the delivery point 91, the item of piece goods 7 is delivered through the delivery point 91 into the receiving means 28 moving on the collection level 2 and is received directly by said means. For this sorting step the receiving means 28 travels over an individually determined route on the collection level 2 depending on further piece goods being conveyed at the same time on level 1 and/or level 2.

The individually determined route is determined individually for the path of the receiving means 28 to the delivery point 91 and/or for the further path of the receiving means 28 loaded with the piece goods away from the delivery point 91, following a choice of route for example, which differs from other receiving means moving on the level 2 and/or avoids crossing with these and thus associated delays and/or minimizes the length of the routes. Preferably each of a plurality of receiving means moving on the collection level 2 travels over an individually determined route, wherein the individually determined routes are determined in coordination in order to avoid crossing and/or to minimize the number of crossings of piece goods to be sorted and/or of routes over which piece goods or receiving means travel.

The route over which the piece goods 7 travels on the delivery level 1 does not absolutely have to be determined individually, in accordance with one form of embodiment of the invention however this route is also able to be determined individually, whereby the flexibility of the method and also of the device is further enhanced.

In accordance with a further exemplary embodiment the delivery point to which the item of piece goods is conveyed on the delivery level 1 and via which the item of piece goods is delivered is likewise individually determined, for example in order to avoid a crossing situation with another or with a number of other items of piece goods being conveyed on the delivery level and/or on the collection level.

Shown in FIGS. 1A-C is a sorting system with two levels 1, 2. In this sense these figures illustrate exemplary embodiments with precisely two levels, namely the delivery level 1 and the collection level 2. At the same time however FIGS. 1A-C also illustrate sorting systems with more than two levels, as well as methods that sort over more than two levels, since the concepts illustrated in FIGS. 1A-C are not restricted to just two levels. In other words: In accordance with further exemplary embodiments the concepts shown in FIGS. 1A-C are implemented in systems with three or even more levels. The concepts shown in FIGS. 1A-C also do not need to take place exclusively between directly adjacent levels, but rather one or more levels can be skipped for a delivery of an item of piece goods into a receiving means in that an item of piece goods is delivered through two or more levels, for example when the delivery points of these levels are arranged above one another.

Figure 2A:
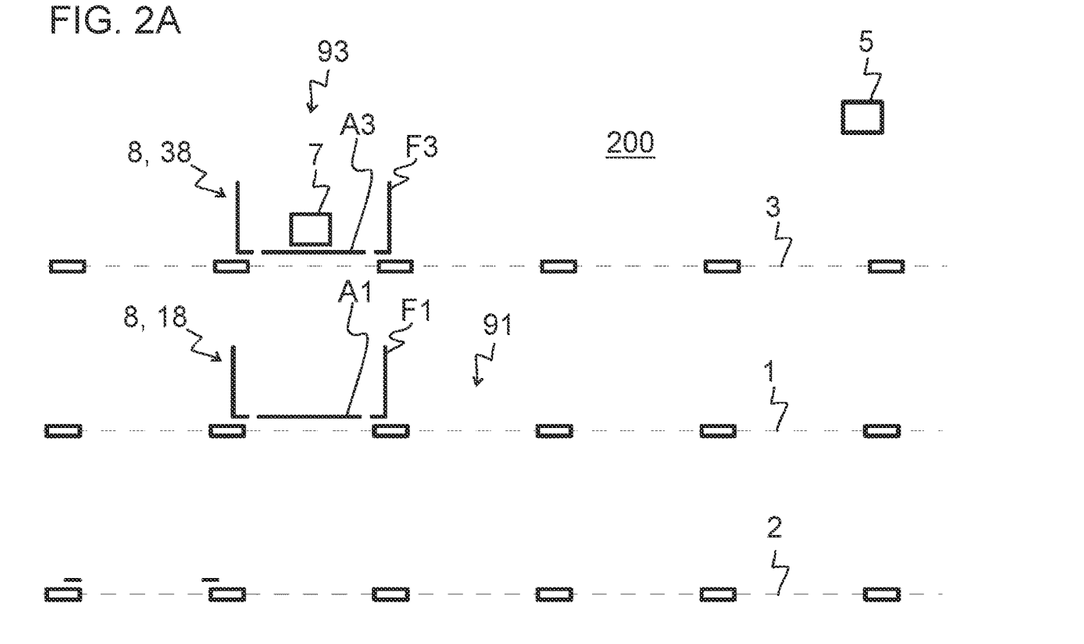
FIGS. 2A and 2B show a schematic side view of a sorting system as well as a method for sorting piece goods in accordance with an exemplary embodiment of the invention.
Figure 2B:
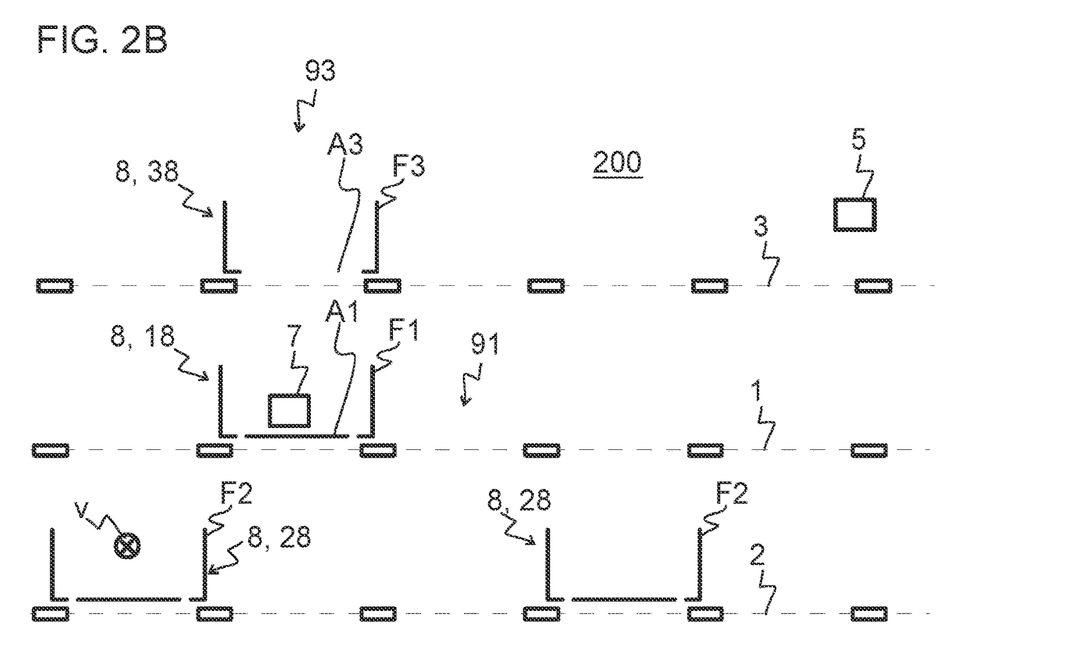

FIGS. 2A and 2B illustrate a further exemplary embodiment of a sorting system 200 and also of a method for sorting piece goods. The sorting system 200 comprises three levels 1, 2, 3. The sorting system 200 comprises the levels 1, 2 corresponding to the exemplary embodiment shown in FIGS. 1A-C. Arranged above the delivery level 2 is a further delivery level 3, which is embodied identically to delivery level 1. A number of piece goods or receiving means 8 respectively are preferably moving on all three levels at the same time. FIG. 2A shows how the item of piece goods 7 has been conveyed to a further delivery point 93 on the further delivery level 3 by the further conveyor means F3 in a further receiving means 38. The control system 5 is adapted to control the conveyor means F1, F2, F3. In a variant of this exemplary embodiment, instead of the conveyor means F3 for the further delivery level, a conveyor route system is used, which conveys the item of piece goods 7 to the delivery point 93 by means of one or more conveyor routes, for example conveyor belts or roller tracks, and there for example delivers it to the delivery level 1 by means of a hinge-down conveyor belt.

After the item of piece goods 7 has been conveyed on the further delivery level 3 to the further delivery point 93 by one of the conveyor means F3 described above, it is thus delivered through the delivery point 93 into the receiving means 18 and received by the latter.

Subsequently the item of piece goods is further sorted above levels 1, 2 using the method described in FIGS. 1A-C. In this process the receiving means 18 travels over an individually determined route to receive the item of piece goods 7 delivered through the delivery point 93. The individual determination of this route is undertaken depending on further piece goods being conveyed at the same time through the sorting system 200. This allows the routes of a plurality of piece goods being conveyed through the sorting system to be determined in a coordinated manner and in this way the sorting system or the sorting method respectively to be optimized.

The routes traveled are determined individually for example in order to optimize the sorting speed, to avoid crossing situations and/or to optimize distances traveled by piece goods and/or receiving means.

As can be seen from level 1 of the sorting system 200, a delivery level in accordance with exemplary embodiments can thus at the same time be a collection level and conversely a collection level can also be a delivery level.

Instead of or in addition to the further delivery level 3 arranged above the level 1, 2, one or more further levels over which sorting is carried out can also be located below the collection level 2 and/or one or more further levels over which sorting is carried out can also be located above the further delivery level 3.

A receiving means 8, 18, 28, 38 can be a container closed on five sides for example, which is driven by suitable actuators. The container can be actively driven, by being a part of an Automated Guided Vehicle for example. The receiving means can likewise be passive, i.e. not comprise its own drive and be embodied as a simple container for example, and be conveyed by driven roller tracks or conveyor belts, which are built into the levels 1, 2, 3. Solutions with container wagons that are driven by linear motors are also possible.

On a delivery level 1, 3, i.e. on a level from which piece goods are delivered to a level lying deeper down, the receiving means preferably comprise a delivery mechanism A1, A3 via which an item of piece goods is delivered via a delivery point. The lowest level can have, but does not have to have a delivery mechanism and can for example as collection means comprise end points each with a large collection bag to receive a number of piece goods.

With the sorting systems illustrated on the basis of FIGS. 2A and 2B the piece goods are sorted over more than two levels arranged above one another. Receiving means, which travel over individually determined routes, are moving on these levels in each case.

FIGS. 3-8 illustrate examples of further exemplary embodiments of a sorting system 300 as well as a method for sorting piece goods.

Figure 3:
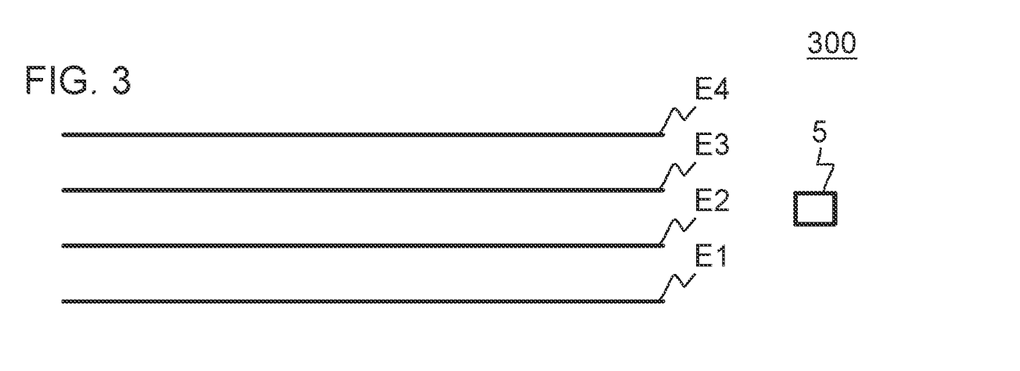
FIG. 3 shows a schematic side view of a sorting system as well as a method for sorting piece goods in accordance with an exemplary embodiment of the invention.

As shown in FIG. 3, the sorting system 300 comprises four horizontal levels E1-E4 arranged above one another, and a control system 5 for controlling and coordinating conveyor means F1-F4 operating on these levels E1-E4. The levels E1-E4 are arranged in parallel to one another.

Figure 8:
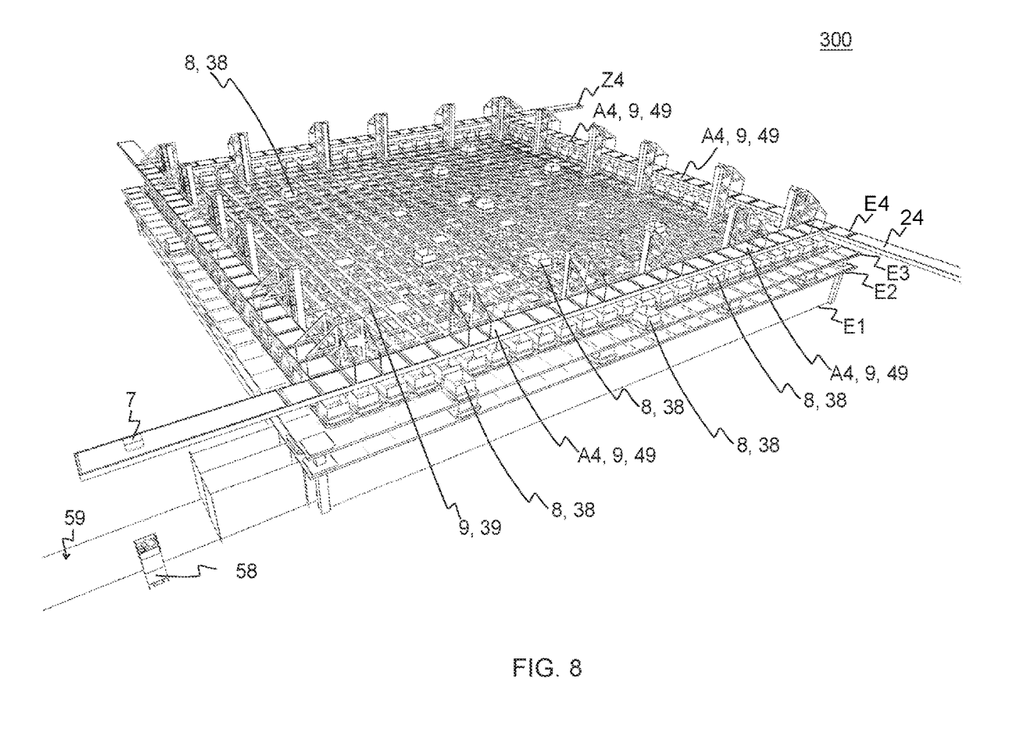
FIG. 8 shows a perspective view of a variant of a sorting system from FIG. 3.

FIG. 8 shows a variant of the sorting system 300 in a perspective view with the four levels E1-E4. The levels E1-E4 are structured in a matrix-like manner. The topmost level E4 comprises a conveyor belt system with conveyor belt elements A4 and supply belts Z4, while the levels lying below it E3, E2, E1 comprise conveyor means for conveying receptacles embodied as receiving means 8. At least a part of the conveyor belt elements A4 in level E4 are embodied as hinge-down delivery points 49, while the receiving means 8 embodied as receptacles 38 of the levels E3, E2 comprise a floor with a delivery shaft, which can be opened for delivery of an item of piece goods and can be closed again for later receipt of a further item of piece goods. The levels E3 and E2 comprise cutouts 39 arranged in a matrix-like manner, through which the piece goods can be delivered from the receiving means 38 to deeper levels. A plurality of receiving means 8 embodied as end points 58 is moving on the level E1 into which the sorted piece goods are collected and which are conveyed via an exit 60 out of the sorting system 300.

The level E4 is therefore embodied as a delivery level. The levels E3, E2 are embodied both as a delivery level and also as a collection level. The level E1 is embodied as a collection level.

The matrix-like structure of the levels E1-E4 shown in FIG. 8 is based on a large matrix for the drawing on paper. In order to be able to better show and explain the way in which the levels E1-E4 function and the means used in these levels E1-E4, the levels E1-E4 shown in FIGS. 4-6 are shown schematically by an example of a smaller matrix, namely a 12×12 matrix. Other matrix arrangements are likewise possible in a diversity of ways, for example the matrix arrangement does not need to be square, but can also have another structure, for example a rectangular structure with a different number of matrix elements in the x direction and the y direction.

FIG. 4 shows a schematic of the level E4 in a view from above. The level E4 comprises four conveyor means embodied as conveyor routes F4, which are embodied to convey piece goods in the respective direction indicated by the arrow, for example in a direction v4, as is shown for one of the conveyor routes F4 shown. The conveyor routes F4 each comprise a supply conveyor belt Z4, which is embodied to supply to the level E4 piece goods that are preferably already singulated or that will be singulated at this point. Each of the supply conveyor belts Z4 has further conveyor belt elements A4 arranged downstream from it, which are embodied to convey the piece goods further. In the embodiment variant shown in FIG. 4 the conveyor routes F4 are arranged so that they form a surrounding structure in an edge area of the level E4. A surrounding structure is not necessary however. In other exemplary embodiments the level E4 can also have just one of the conveyor routes F4 or a number of the conveyor routes F4 or one or more conveyor routes arranged in some other way.

The conveyor belt elements A4, or at least one or more of the conveyor belt elements A4, are arranged as hinge-down elements, so that when one of the conveyor belt elements A4 is hinged down, an item of piece goods located thereon is delivered to the level E3 lying below it. In other words: The hinge-down conveyor belt elements A4 form delivery points 9, 49 (of which in FIG. 4 and FIG. 8 only single elements are labeled with these reference characters for reasons of clarity), through which an item of piece goods can be delivered to a level E3, E2, E1 lying lower down.

Figure 7:
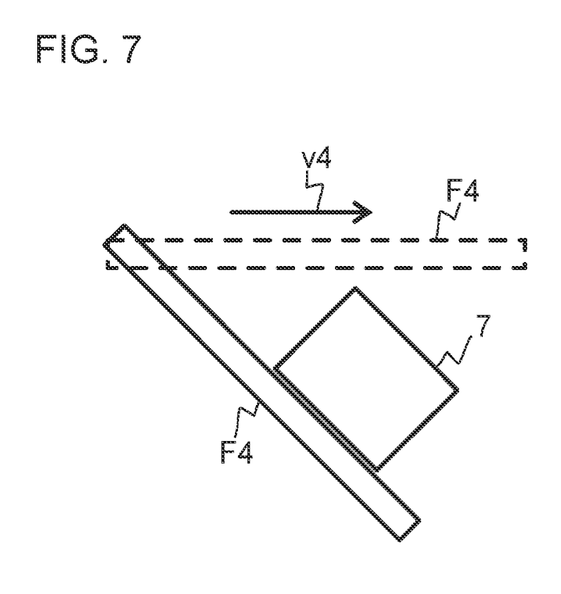
FIG. 7 shows a schematic of a hinge-down conveyor belt element for the topmost level shown in FIG. 4.

FIG. 7 shows an embodiment of a hinge-down conveyor belt element F4 as solid lines in a hinged-down state and as dashed lines in a non hinged-down state. The conveyor belt element F4 comprises a delivery mechanism, which lets an edge of the conveyor belt element F4 lying furthest forward in the delivery direction v4 hinge downwards, as shown in FIG. 7.

FIG. 5 illustrates the level E3 of the sorting system 300. The sorting system 300 comprises a conveyor system, which is embodied to convey a collection means on routes structured in a matrix-like manner in the level E3. The exemplary embodiment shown in FIG. 5, as already stated above, shows a 12×12 matrix.

The level E3 can be realized in a simple manner for example by means of a matrix-like carrier system arranged horizontally in the level E3, with carriers running in the x direction and orthogonally thereto in the y direction. The carriers define tracks on which Automated Guided Vehicles (AGVs) with a container open at the top and otherwise closed on five sides can move in the x direction or in the y direction. Between the carriers are rectangular empty spaces in the level E3, which define possible delivery points 39 for delivery of piece goods to the levels E2 and E1 lying below. The AGVs are or comprise drives embodied as conveyor means as well as containers 38 embodied as receiving means 8, closed on five sides, which are open at the top.

Instead of AGVs other conveyor means and receiving means can also be used on the level E3. In one variant conveyor means on the level E3 also comprise permanently installed conveyor belt elements and containers arranged in a matrix-like manner for example. Each of these conveyor belt elements is embodied optionally to convey a receiving means embodied as a container located on the conveyor element in Cartesian directions, i.e. optionally either in an x direction or in a y direction lying orthogonally in relation to the x direction. Such a conveyor element is installed on each of the 12×12=144 matrix fields shown in FIG. 5. At least where delivery points are defined for the conveyor system 300 these conveyor belt elements are embodied so that they have a cutout in the middle, through which the item of piece goods can be delivered to a level lying lower down.

In accordance with a preferred embodiment variant the matrix of the level E3 is divided into different areas, which are intended for different functions, for example into the following three areas ZB, SB, OB, which are delimited from one another in FIG. 5 by dotted and dashed lines: The level E3, in a central area ZB, comprises the delivery points 39, through which an item of piece goods is able to be delivered to the levels E2, E1 lying below it. The central area ZB can be seen in FIG. 3 by the fact that all matrix fields there are labeled with the number 39, which matrix fields identify the delivery points 39. In FIG. 5 the central area is shown as an 8×8 matrix for example. Running around this central area ZB and directly below the hinge-down conveyor belt elements A4 of the conveyor means F4 of the level E4 a storage area SB is provided on the level E3. For better visualization a vertical projection of one of the conveyor means F4 on the level E3 is shown in FIG. 5 as a dashed outline. Empty collection means 38 are located on matrix fields of the storage area SB, which collect the piece goods delivered from the hinge-down conveyor belt elements A4. The storage area SB is the second area from the outside. Preferably each of the matrix fields of the storage area SB is only occupied by an empty collection means 38 for as short a time as possible. Therefore in FIG. 5 all matrix fields in the storage area SB are shown as being occupied by a receiving means 38.

To this end, in order to ensure an occupancy of the storage area SB that is as good as possible, an outer area OB can be provided in the level E3 around the storage area SB, to which individual empty receiving means 38 move and, as soon as a receiving means 38 waiting in the storage area SB has received an item of piece goods, occupies the space vacated by it.

This ensures that in storage area SB matrix fields are only empty for as short a time as possible, i.e. are not occupied by an empty collection means 38. This makes it possible to further enhance the efficiency of the sorting system 300. But more dynamic solutions are also possible, in which the collection means 38 do not wait in the storage area SB, but are conveyed with it explicity to an item of piece goods delivered by one of the conveyor belt elements A4 and to collect this on level E3.

For sorting the piece goods the receiving means 38 travel over individually determined routes on the level E3. In other words: The level E4 is a delivery level and the level E3 is a collection level on which at least one receiving means 38 is moving, into which an item of piece goods is delivered by the conveyor means F4. On the collection level E3 the receiving means 38 travel over individually determined routes for sorting the piece goods to be sorted to collect the piece goods in the storage area SB and/or to convey the piece goods further and deliver them in the central area. In this way the sorting system 300 or the sorting process respectively can be optimized for a plurality of piece goods to be sorted at the same time, in order for example to sort a given large number of piece goods as efficiently as possible. To be able to design the sorting process even more efficiently, the piece goods 7 also travel on the level E4 in such cases over an individually determined route for example to a delivery point 9 to be determined individually on the level E4 in order to deliver the item of piece goods into an especially suitable receiving means 38 on the level E3.

When the piece goods 7 have been received by one of the receiving means 38 on the level E3, the piece goods are conveyed in this receiving means 38 into the central area of the level E3 via an individually determined route to an individually determined delivery point 39 of the level E3 and are delivered there via a delivery mechanism, for example a delivery shaft that can be opened and then closed again, into the container 38 on the level E2 or the level E1. The receiving means 38 on the level E3 that has become free then takes itself again to an empty point of the storage area SB.

The level E2 is constructed in the same way as the level E3, i.e. with carrier paths in a matrix-like manner covering the same area as level E2, and a division into the three areas ZB, SB, OB as well as further receiving means 8 moving on the level E2, which can be identical to the receiving means of the level E3.

Unlike in level E3, the receiving means 8 on level E2, in the central area ZB below the delivery points 9 from the level E3, collect piece goods delivered through the delivery points 9. To this end a receiving means 8 moving on the level E2 travels over an individually determined route. In this way the flexibility of the sorting system 300 can be further enhanced, for example by the individually determined routes being optimized for a large number of piece goods to be sorted at the same time for a sorting duration that is as short as possible for the totality of piece goods to be sorted.

FIG. 6 shows the lowest level E1 of the sorting system 300. Receiving means 8 embodied as end points 58 are located on or moving on the level E1. From the receiving means 8 of the level E2, optionally also from receiving means 38 of the level E3, in the central region piece goods 7 are delivered according to at least one predetermined sorting criterion directly into one of the end points 58. For example each of the end points 58 represents a zip code or a delivery region according to which the piece goods, for example parcels, are sorted.

An end point 58, when it is full for example or when the sorting process is at an end or at a predetermined point in time, is conveyed out of the sorting system 300 via an exit 59. To this end a further conveyor means can be provided. For example a receiving means 58 can be embodied as a container below which an AGV is able to be moved, wherein the AGV has a lifting mechanism, which lifts the receiving means 58 and in this way conveys it to a desired location. Empty end points 58 are also positioned in this way, i.e. by means of lifting and conveyance by an AGV, to a desired matrix field below a delivery point. In this case the end point 58 travels over an individually determined route on the level E4, to prevent collisions for example, or with a high volume of parcels for a specific delivery region, to provide redundant end points for this delivery region in the level E4, or to be conveyed to an individually determined collection point.

A matrix sorter with three levels represents a further exemplary embodiment, which only comprises the three levels E4, E3, E1, but not the level E2. In this case the piece goods to be sorted are delivered from the conveyor belt system F4 as described above into the receiving means 38 on the level E3 and are received by said means. From the receiving means 38 the piece goods are then sorted directly into the end points 58.

In accordance with exemplary embodiments the levels E1-E4 as well as the levels 1-3 are preferably arranged in parallel with one another.

In accordance with one exemplary embodiment one application comprises a Cartesian matrix sorter for the sorting of piece goods of for example small size (small goods sorter).

In accordance with one exemplary embodiment the goods are initially singulated conventionally and delivered at synchronized speed into passive or self-driving container wagons.

The passive container wagons are actively conveyed by linear acting actuators (linear motors, rollers, belts) to a number of matrix system levels.

The container wagons have a trapdoor (flap, scoop, roller floor), via which the goods are delivered downwards and thus can be ejected. This for example trapdoor latching is for example spring pre-tensioned and is triggered at the transfer point from outside or internally. The flap is closed again externally or internally and locked by the renewed movement of the wagon.

Via a number of levels of moving wagons or other conveyable receiving means the piece goods are delivered, in a manner that protects the goods, into a roller wagon able to be moved in a matrix close to the ground with a constrained container (sack) and conveyed in this way to the destination point, sorted or picked. The moving wagons or other conveyable receiving means can be arranged or conveyed with minimal horizontal and/or vertical distances between them.

Further exemplary embodiments comprise:
  A shortening of distances and reduction of the throughput-reducing crossing events caused by end points approaching each other for example on the level E1, which for their part lie in a conveyor matrix below receiving means on another level (multi-level matrix);
  A shortening of distances by additional intermediate load handling devices approaching each other, for example on the level E2 and E3 to a number of levels lying below and in the direction in which the goods fall;

- A considerable reduction in throughput-reducing crossing events through at least one intermediate level, for example E2 or E3;
- A reliable transport of inhomogeneous postal goods via container wagons closed on five sides (bomb bay);
- A possibility of a very high transport speed and acceleration of the goods through the box shape of the containers.

The invention claimed is:

1. A sorting system for sorting piece goods over at least two levels disposed above one another, the sorting system comprising:
    a delivery level having ends, a collection level, a delivery level conveyor device for conveyance of piece goods on said delivery level and a collection level conveyor device for conveyance of piece goods on said collection level;
    said collection level disposed below said delivery level;
    said delivery level including delivery points for delivering piece goods from said delivery level to said collection level over said delivery points, said delivery points being cutouts formed in said delivery level, and said delivery points being disposed along said delivery level and spaced apart from said ends of said delivery level;
    said delivery level conveyor device including a delivery device configured to deliver an item of piece goods through one of said delivery points;
    said collection level conveyor device including a receiving device configured to receive the item of piece goods delivered through said delivery point; and
    said collection level conveyor device configured to cause said receiving device to travel over an individually determined route on said collection level.

2. The sorting system according to claim 1, wherein said delivery level conveyor device is configured to cause the piece goods to travel over an individually determined route on said delivery level.

3. The sorting system according to claim 1, which further comprises:
    a further delivery level and a further conveyor device for conveyance of piece goods on said further delivery level;
    said further delivery level disposed above said delivery level;
    said delivery level conveyor device including a delivery level receiving device configured to receive the item of piece goods;
    said further delivery level including further delivery points; and
    said further conveyor device configured to deliver the piece goods through one of said further delivery points into said collection level receiving device.

4. The sorting system according to claim 3, which further comprises a receiving device moving on said further level, at least one of said receiving device moving on said collection level or said receiving device moving on said delivery level or said receiving device moving on said further level includes at least one container wagon having a delivery mechanism.

5. The sorting system according to claim 4, wherein said delivery mechanism is a trapdoor, a flap, a scoop, a roller floor or a delivery mechanism closed on five sides.

6. The sorting system according to claim 3, which further comprises a receiving device moving on said further level, and actuators configured to drive at least one of said receiving device moving on said collection level or said receiving device moving on said delivery level or said receiving device moving on said further level.

7. The sorting system according to claim 6, wherein said actuators are rollers or belts disposed at least one of in said collection level or in said delivery level or in said further delivery level.

8. The sorting system according to claim 3, which further comprises a receiving device moving on said further level, at least one of said receiving device moving on said collection level or said receiving device moving on said delivery level or said receiving device moving on the further level includes its own drive for locomotion.

9. The sorting system according to claim 3, which further comprises a control system adapted to select at least one of the individually determined route of said receiving device on said collection level or an individually determined route of the piece goods on said delivery level or an individually determined route of the piece goods through the sorting system or said delivery point on said delivery level or said further delivery point on said further delivery level.

10. The sorting system according to claim 9, wherein said control system is adapted to determine at least one of routes to be traveled over or delivery points in a coordinated manner, for a number of piece goods being simultaneously sorted by the sorting system.

11. The method according to claim 9, which further comprises at least one of:
    conveying the piece goods by using a receiving device moving on the delivery level to the delivery point and delivering the piece goods at the delivery point into or onto the receiving device moving on the collection level, or
    moving the receiving device traveling on the delivery level over an individually determined route for sorting the piece goods.

12. The method according to claim 9, which further comprises before conveying the piece goods on the delivery level, conveying the piece goods on a further delivery level disposed above the delivery level to a further delivery point and delivering the piece goods at the further delivery point into or onto the receiving device moving on the delivery level.

13. The method according to claim 12, which further comprises providing at least one of the receiving device moving on the collection level or the receiving device moving on the delivery level or a receiving device moving on the further delivery level with a container wagon including a delivery mechanism.

14. The method according to claim 13, which further comprises providing the delivery mechanism as a trapdoor, a flap, a scoop or a roller floor configured to deliver the piece goods.

15. A method for sorting piece goods, the method comprising:
    conveying an item of piece goods to be sorted on a delivery level to a delivery point;
    providing the delivery point as a cutout formed in the delivery level, and providing the delivery point along the delivery level and spaced apart from ends of the delivery level;
    delivering the item of piece goods at the delivery point into a receiving device moving in or on a collection level and receiving the item of piece goods in the receiving device;
    locating the collection level below the delivery level; and moving the receiving device over an individually determined route for sorting the piece goods on the collection level.

16. The method according to claim 15, which further comprises sorting the piece goods over two or more of the levels disposed above one another, and moving receiving devices on the levels over individually determined routes.

17. The method according to claim 15, which further comprises providing the receiving device moving on the collection level as an end point.

18. The method according to claim 12, which further comprises at least one of:
  selecting the delivery point from a plurality of delivery points disposed on the delivery level, or
  selecting the further delivery point from a further plurality of delivery points disposed on the further delivery level.

* * * * *